United States Patent
Hahn et al.

(10) Patent No.: US 7,970,740 B1
(45) Date of Patent: Jun. 28, 2011

(54) AUTOMATED SERVICE CONFIGURATION SNAPSHOTS AND FALLBACK

(75) Inventors: Stephen C. Hahn, Redwood City, CA (US); Liane Praza, Redwood City, CA (US); Jonathan William Adams, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1775 days.

(21) Appl. No.: 10/948,828

(22) Filed: Sep. 23, 2004

(51) Int. Cl.
*G06F 11/00* (2006.01)

(52) U.S. Cl. ........ 707/649; 707/639; 711/161; 711/162; 714/39

(58) Field of Classification Search .................. 711/118, 711/161, 162
See application file for complete search history.

(56) References Cited

U.S. PATENT DOCUMENTS

| | | | | |
|---|---|---|---|---|
| 5,701,480 A * | 12/1997 | Raz | ............................... | 718/101 |
| 6,101,585 A * | 8/2000 | Brown et al. | ................. | 711/162 |
| 6,356,904 B1 * | 3/2002 | Moriyama | ....................... | 707/10 |
| 6,470,334 B1 * | 10/2002 | Umemoto | ............................. | 1/1 |
| 6,470,344 B1 * | 10/2002 | Kothuri et al. | ................. | 707/100 |
| 7,043,503 B2 * | 5/2006 | Haskin et al. | ................. | 707/200 |
| 7,143,120 B2 * | 11/2006 | Oks et al. | ....................... | 707/202 |
| 7,143,307 B1 * | 11/2006 | Witte et al. | ....................... | 714/6 |
| 7,174,443 B1 * | 2/2007 | Vorbach et al. | ............... | 712/229 |
| 7,174,451 B2 * | 2/2007 | Zimmer et al. | ..................... | 713/2 |
| 7,203,868 B1 * | 4/2007 | Evoy | .............................. | 714/39 |
| 2002/0026572 A1 * | 2/2002 | Joory | .............................. | 713/100 |
| 2003/0009431 A1 * | 1/2003 | Souder et al. | ..................... | 707/1 |
| 2003/0110368 A1 * | 6/2003 | Kartoz | ............................. | 713/1 |
| 2003/0167380 A1 * | 9/2003 | Green et al. | .................. | 711/136 |
| 2004/0117572 A1 * | 6/2004 | Welsh et al. | .................. | 711/162 |
| 2004/0139128 A1 * | 7/2004 | Becker et al. | ................. | 707/204 |
| 2004/0267836 A1 * | 12/2004 | Armangau et al. | ........... | 707/203 |

* cited by examiner

*Primary Examiner* — Don Wong
*Assistant Examiner* — Shyue Jiunn Hwa
(74) *Attorney, Agent, or Firm* — Osha • Liang LLP

(57) ABSTRACT

In general, in one aspect, the invention relates to a method for taking a snapshot of a service instance, including transitioning the service instance to a new state, determining whether to take the snapshot based on the new state, obtaining a property composition of the service instance, and taking the snapshot using the property composition, if the snapshot is to be taken.

22 Claims, 6 Drawing Sheets

AUTOMATED SERVICE CONFIGURATION SNAPSHOTS AND FALLBACK

BACKGROUND

The principal tasks of a system administrator or a company's Information Technology (IT) department are to configure and deploy computer systems (e.g., personal computers, servers, etc.) and to repair computer systems when they fail. With respect to computer systems such as servers, the system administrators typically have to install the operating system and configure each service offered by the operating system (e.g., name service based on DNS (domain name service), etc.) Each service is typically dependent on (or impacts) another service provided by the operating system. Thus, when the administrator is configuring a service on a new server, the administrator typically manually configures one service at a time and checks to ensure that the configuration of the particular service does not negatively impact the other services offered by the operating system.

If an incorrect configuration change is applied the system may fail to start. Alternatively, if a partial configuration change is read by a service currently executing on the server, the executing service may abort. In an effort to aid the administrator in efficiently restarting a server after an incorrect configuration change, many modern operating systems include functionality to take and store a snapshot of the server. The snapshot typically corresponds to the boot configuration of the entire system recorded during the last successful booting of the server. Thus, if the administrator makes an incorrect configuration change, the administrator may in effect "undo" the incorrect configuration by reverting back to the configuration of the last successful boot of system (i.e., the configuration stored in the snapshot).

SUMMARY

In general, in one aspect, the invention relates to a method for taking a snapshot of a service instance, comprising transitioning the service instance to a new state, determining whether to take the snapshot based on the new state, obtaining a property composition of the service instance, and taking the snapshot using the property composition, if the snapshot is to be taken.

In general, in one aspect, the invention relates to a system comprising a service instance executing on the system, a state machine configured to define at least a first state and a second state of the service instance, and a restarter configured to transition the service instance from the first state to the second state and configured to take a snapshot of the service instance.

In general, in one aspect, the invention relates to a plurality of nodes comprising a service instance executing on the system, a state machine configured to define at least a first state and a second state of the service instance, and a restarter configured to transition the service instance from the first state to the second state and configured to take a snapshot of the service instance, wherein the service instance is executing on one of the plurality of nodes, wherein the state machine resides on one of the plurality of nodes, wherein the restarter resides on one of the plurality of nodes.

Other aspects of the invention will be apparent from the following description and the appended claims.

DETAILED DESCRIPTION

Figure 1:
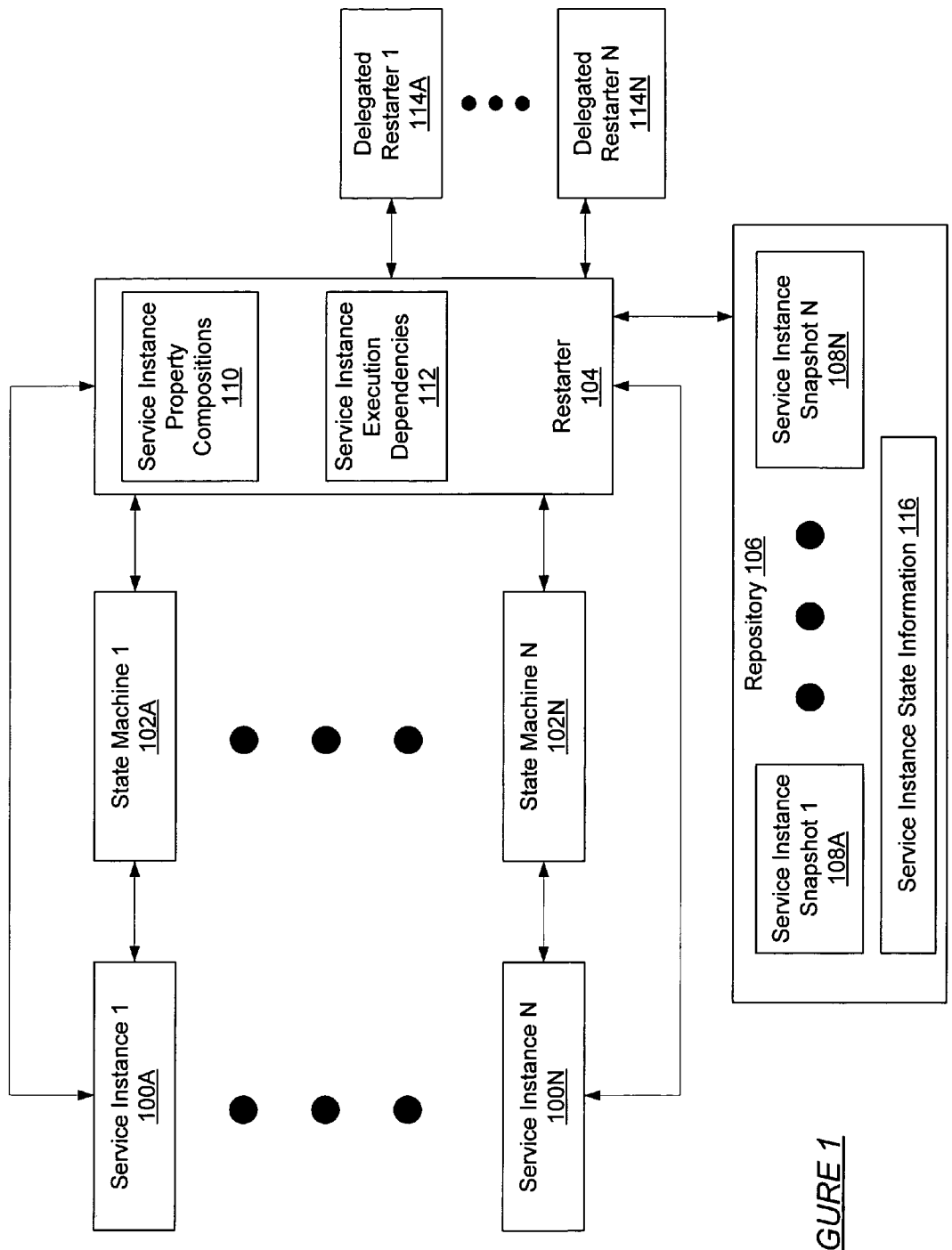
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, the invention relates to a method and apparatus for taking a snapshot of a service instance. More specifically, the invention provides a method for taking a snapshot of the configuration properties of the service instance. Further, the invention provides a method and apparatus for automatically taking snapshots. In addition, the invention provides a method and apparatus for taking snapshots based on states of the service instance as defined by a state machine. Further, embodiments of the invention provide functionality to obtain a per-service instance snapshot.

FIG. 1 shows a system in accordance with one embodiment of the invention. The system includes one or more service instances (service instance 1 (100A), service instance N (100N)). A service instance (service instance 1 (100A), service instance N (100N)) corresponds to an instance of a service executing on a system. In one embodiment of the invention, the service corresponds to a set of long-running processes providing a known list of capabilities to other local and remote services. File systems, naming service cache daemons, and an active network interface are examples of services.

In one embodiment of the invention, each service instance (service instance 1 (100A), service instance N (100N)) defines a set of methods that stop, start, and refresh the service instance (service instance 1 (100A), service instance N (100N)). The service may also define methods to: (1) monitor the activity of the executing service instance (service instance 1 (100A), service instance N (100N)); (2) enable an instance of the service; (3) disable an instance of the service; and (4) provide a restarter-specific action associated with the service.

Figure 3:
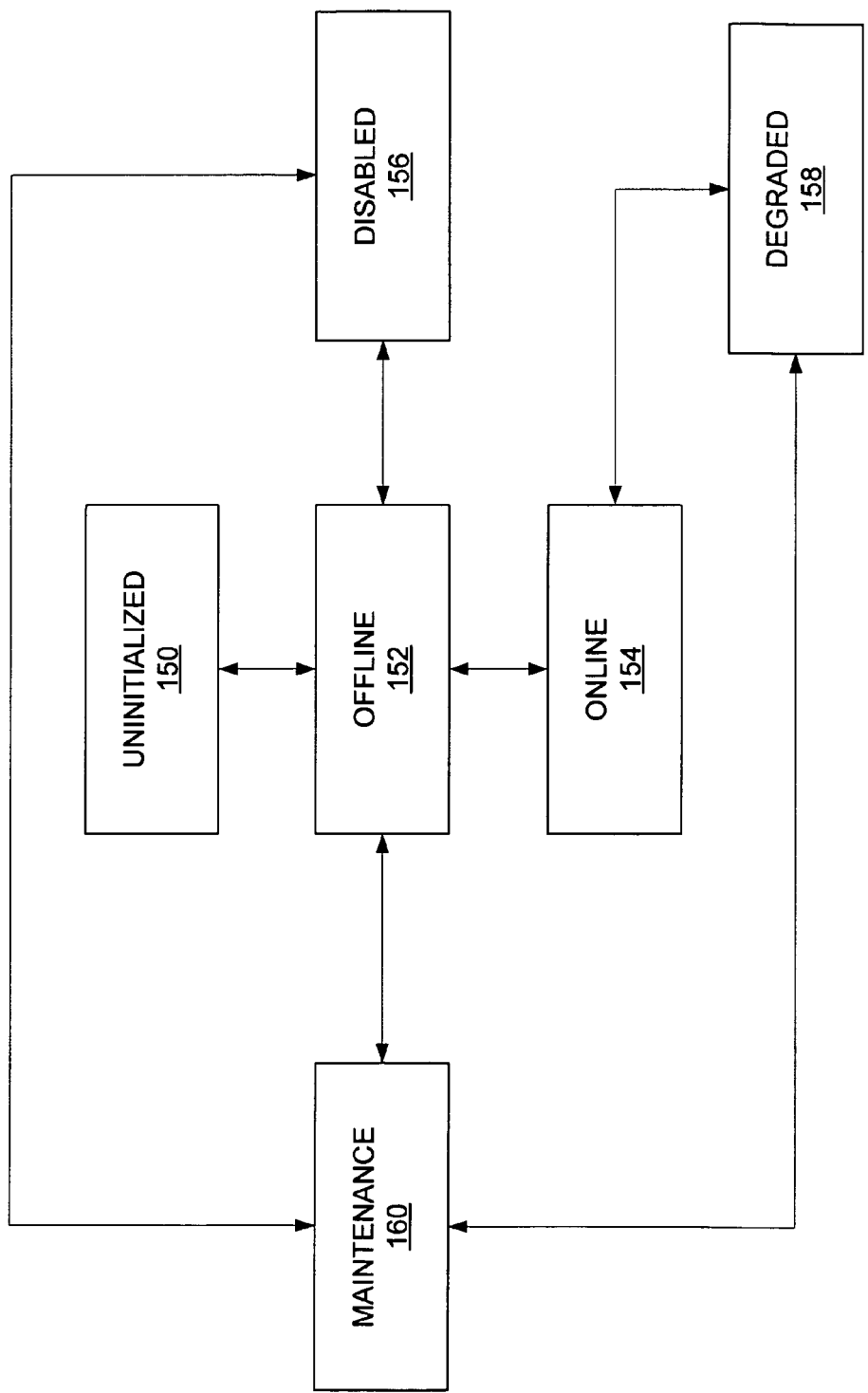
FIG. 3 shows a diagram for a state machine in accordance with one embodiment of the invention.

Continuing with the discussion of FIG. 1, each service instance (service instance 1 (100A), service instance N (100N)) is associated with a corresponding state machine (state machine 1 (102A), state machine N (102N)). In one embodiment of the invention, the state machine (state machine 1 (102A), state machine N (102N)) defines one or more states associated with the service instance (service instance 1 (100A), service instance N (100N)). Further, the state machine (state machine 1 (102A), state machine N (102N)) may define conditions that must be met in order for the service instance (service instance 1 (100A), service instance N (100N)) to transition from one state to another. In addition, the state machine defines actions to be performed by processes, such as a restarter (104) or a delegated restarter (delegated restarter 1 (114A), delegated restarter N (114N)) for the service instance (service instance 1 (100A), service instance N (100N)) to transition from one state to another. In one embodiment of the invention, the state machine (state machine 1 (102A), state machine N (102N)) also defines when to take a snapshot of the corresponding service instance (service instance 1 (100A), service instance N (100N)). An example of a state machine is shown in FIG. 3 and described below.

Each state machine (state machine 1 (102A), state machine N (102N)) is operatively connected to the restarter (104). In one embodiment of the invention, the restarter (104) is configured to manage each service, or more specifically, each service instance (service instance 1 (100A), service instance N (100N) executing in the system. Further, the restarter (104) is configured to use the state machines (state machine 1 (102A), state machine N (102N)) to track the state of each service instance (service instance 1 (100A), service instance N (100N)) and to perform appropriate actions based on the state of the service instance (service instance 1 (100A), service instance N (100N)). These actions may include restarting a particular service instance (service instance 1 (100A), service instance N (100N)) in the system, taking a snapshot of a particular service instance (service instance 1 (100A), service instance N (100N)), etc.

In one embodiment of the invention, the restarter (104) includes information about the service instance execution dependencies (112) and information about the service instance property compositions (110). The service instance execution dependencies (110) correspond to information about what other service instances on which each service instance is dependent (i.e., what other service instance(s) must be executing on the system in order for a particular service instance to properly execute on the system). Information about service instance execution dependencies (112) is typically used to determine whether to transition a service instance from one state to another. The service instance property compositions (110) correspond to the various configuration sources for each service instance. The service instance property compositions (110) are typically used to obtain a service instance snapshot (service instance snapshot 1 (108A), service instance snapshot N (108N)).

The restarter (104) is further associated with one or more delegated restarters (delegated restarter 1 (114A), delegated restarter N (114N)). Delegated restarters (delegated restarter 1 (114A), delegated restarter N (114N)) provide specialized functionality to restart particular service instances (service instance 1 (100A), service instance N (100N)). The delegated restarters (delegated restarter 1 (114A), delegated restarter N (114N)) typically perform specific actions on behalf of the restarter (104).

In one embodiment of the invention, the restarter (104) is operatively connected to a repository (106). In one embodiment of the invention, the repository (106) stores one or more service instance snapshots (service instance snapshot 1 (108A), service instance snapshot N (108N)) for the service instances (service instance 1 (100A), service instance N (100N)) executing on the system. Service instance snapshots (service instance 1 (100A), service instance N (100N)) are discussed in FIG. 2. The current state of each service instance (service instance 1 (100A), service instance N (100N)) may also be stored in the repository (106). In one embodiment of the invention, information stored in the repository (106) may be stored in an Extensible Mark-up Language (XML) format, in a binary-format file, etc. Further, in one embodiment of the invention, the repository (106) is transactional and able to provide any one of the various service instance snapshots (service instance snapshot 1 (108A), service instance snapshot N (108N)) associated with a particular service instance (service instance 1 (100A), service instance N (100N)) to a requesting process. In one embodiment of the invention, the repository (106) is distributed across multiple nodes (defined below) in the system.

Figure 2:
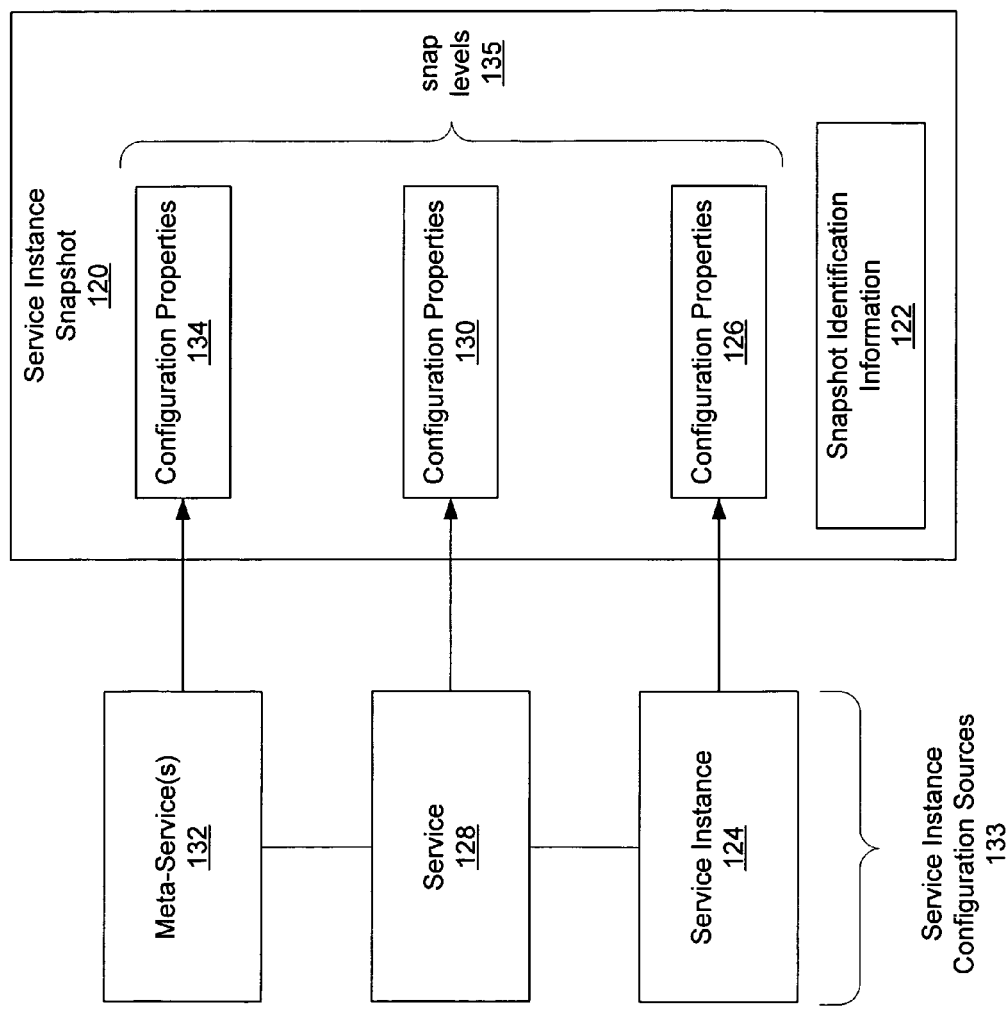
FIG. 2 shows a service instance snapshot in accordance with one embodiment of the invention.

FIG. 2 shows a service instance snapshot in accordance with one embodiment of the invention. The service instance snapshot (120) shown in FIG. 2 includes three snap levels (135) (i.e., three distinct configuration properties (126, 130, 134)) and snapshot identification information (122) (i.e., information used to identify the particular service instance snapshot). The configuration properties (configuration properties (126), configuration properties (130), and configuration properties (134)) correspond to the configuration properties of the various configuration sources required to configure the service instance (124). In the particular example shown in FIG. 2, the service instance (124) is dependent (with respect to configuration) on a service (128). The service (128) is in turn dependent (with respect to configuration) on a meta-service (132) (i.e., another service). In one embodiment of the invention, the configuration sources (133) may be distributed across multiple nodes (described below) in the system.

Thus, there are three configuration sources (133) for the service instance (124), namely, the service instance (124) itself, the service (128), and the meta-service (132). Accordingly, the service instance snapshot (120) includes three snap levels (135), one corresponding to each configuration source. Thus, each of the configuration sources (133) is associated with a corresponding snap level (135). The snap levels (135) in turn are combined to produce the service instance snapshot (120). Alternatively, all the configuration properties (i.e., (configuration properties (126), configuration properties (130), and configuration properties (134)) associated with a given service instance (124) may be directly associated with the service instance (124), as opposed to using individual snap levels (135). In one embodiment of the invention, the dependency relationship of the configuration sources (133) (shown in FIG. 2) corresponds to a service instance property composition (110). Those skilled in the art will appreciate that while FIG. 2 shows a service instance snapshot having three snap levels, other service instance snapshots may have more or less snap levels.

In one embodiment of the invention, each service instance snapshot (120) may be labeled. The label for a particular service instance snapshot may be included in the snapshot identification information (122). In one embodiment of the invention, the labels may include (but are not limited to) initial, editing, running, start, boot, and previous. A label of initial corresponds to a service instance snapshot of the initial configuration of the service instance at either package install or administrative initial creation. A label of editing corresponds to a service instance snapshot of the most recent configuration changes to the instance. A label of running corresponds to a service instance snapshot of the running configuration of the service instance. A label of start corresponds to the service instance snapshot of the configuration of the service instance during a successful transition to the online state (defined below). A label of boot corresponds to the service instance snapshot of the configuration of the service instance during a successful boot to the online state (defined below) after system boot. Finally, a label of previous corresponds to the service instance snapshot of the configuration of the service instance captured when an administrative "undo" is performed.

FIG. 3 shows a diagram for a state machine in accordance with one embodiment of the invention. In one embodiment of invention, the state machine includes the following states: uninitialized (150), offline (152), disabled (156), online (154), degraded (158), and maintenance (160). Each state shown in FIG. 3 can transition to at least one other state within the state machine. The transition from one state to another within the state machine is governed by the execution dependencies of the service instance, as well as the results of executing methods and monitors (defined above) associated with the service instance. Accordingly, the service instance is always in a well-defined state.

In one embodiment of the invention, the uninitialized (150) state corresponds to the initial state for all service instances. In one embodiment of the invention, a service instance in the offline (152) state is enabled but not yet executing on the system or able to execute on the system. If the restarter's execution of the start method of the service instance is successful, the service instance transitions to the online (154) state. Failure of the service's start method may result in the service instance transitioning to the maintenance (160) state. In one embodiment of the invention, if the service instance is in an online (154) state, then the service instance is enabled and running (or available to run). The specific nature of the online state depends on the specific application model required, and is defined by the restarter responsible for the service instance. The online (154) state is the expected state for a properly configured service instance with all service instance execution dependencies satisfied.

In one embodiment of the invention, the service instance that is in the degraded (158) state is enabled and is running (or available to be run on the system) but is running (or available to run) at a limited capacity in comparison to normal operation. In one embodiment of the invention, the service instance is in a maintenance (160) state, where the service instance is enabled but not able to run on the system. In one embodiment of the invention, when the service instance is in a degraded (158) state, the service instance is enabled but not performing optimally (for example, because one or more portions of the service instance is not working correctly). Although not shown in FIG. 3, the service instance may also be in a legacy-run state. Service instances in a legacy-run state corresponds to service instances that are executing in the system, but due to legacy implementations, may only be observed and not managed by the restarter. Those skilled in the art will appreciate that the aforementioned discussion of the state machine and states within the state machine is only one implementation of the concept and that other implementations are also within the scope of the invention.

Figure 4:
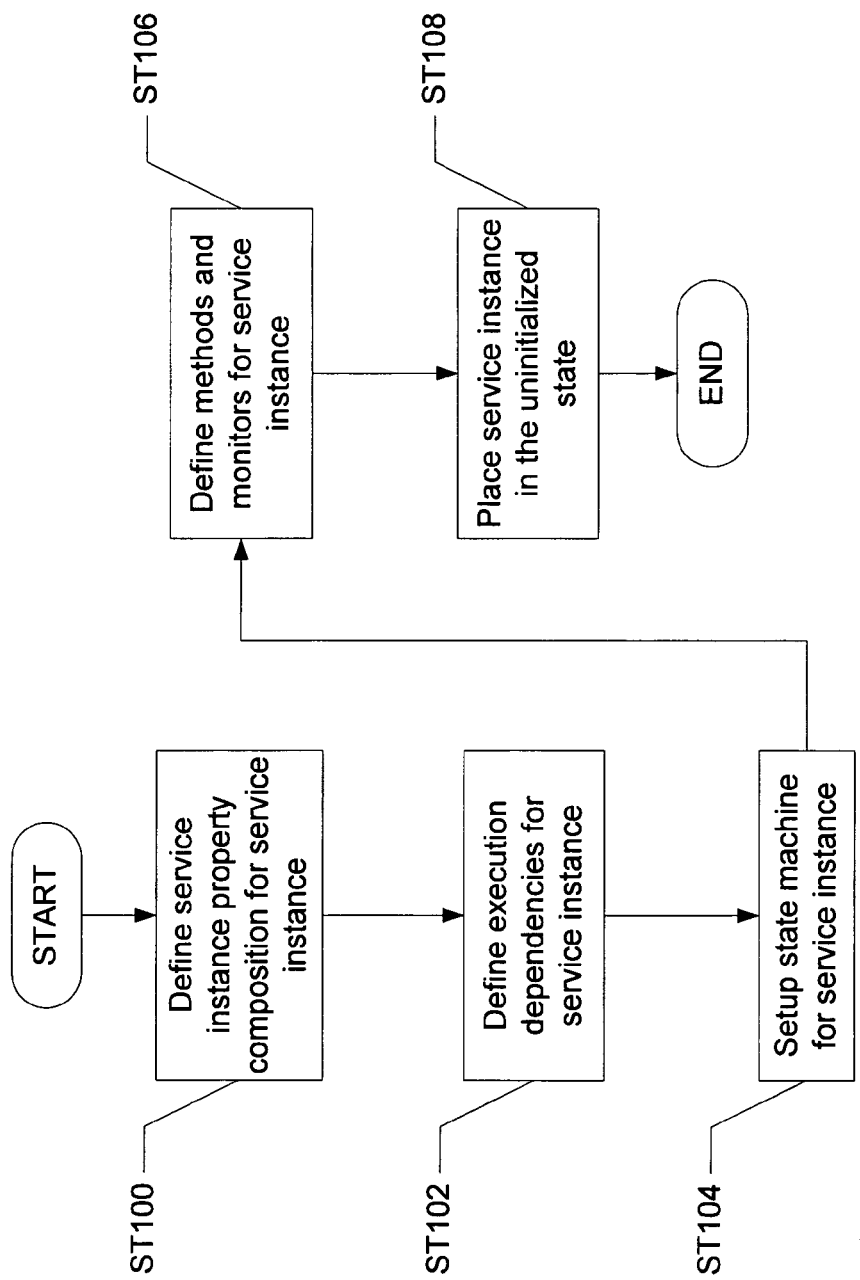
FIGS. 4-5 show flowcharts in accordance with one embodiment of the invention.

FIG. 4 shows a flowchart for setting up a system to perform an embodiment of the invention in accordance with one embodiment of the invention. Initially, a property composition for a service instance is defined (ST100). As noted above, the property composition for the service instance corresponds to the configuration sources of the service instance (see e.g., FIG. 2). Next, the execution dependencies for the service instance are defined (ST102). As noted above, the execution dependencies correspond to the other processes (including services) that must be executing in the system prior to the service instance being able to execute in the system. The state machine associated with the service instance is subsequently setup (ST104). Setting up of the state machine may correspond to defining the various states in the state machine and requirements to transition from one state in the state machine to the next.

The methods and monitors for the service instance may subsequently be defined (ST106). As noted above, the methods (e.g., start, stop, etc.) and monitors defined for the service instance are used by the restarter to perform actions on the service instances and to monitor the results of such actions. Note that in one embodiment of the invention ST106 may be performed prior to ST104. Upon completion of ST106, the service instance is placed in the uninitialized state. After the method shown in FIG. 4 is performed, the system may proceed to monitor the service instance, performing certain methods defined by the service instance (e.g., start, stop, refresh, etc.), and automatically take configuration snapshots of the service instance.

Figure 5:
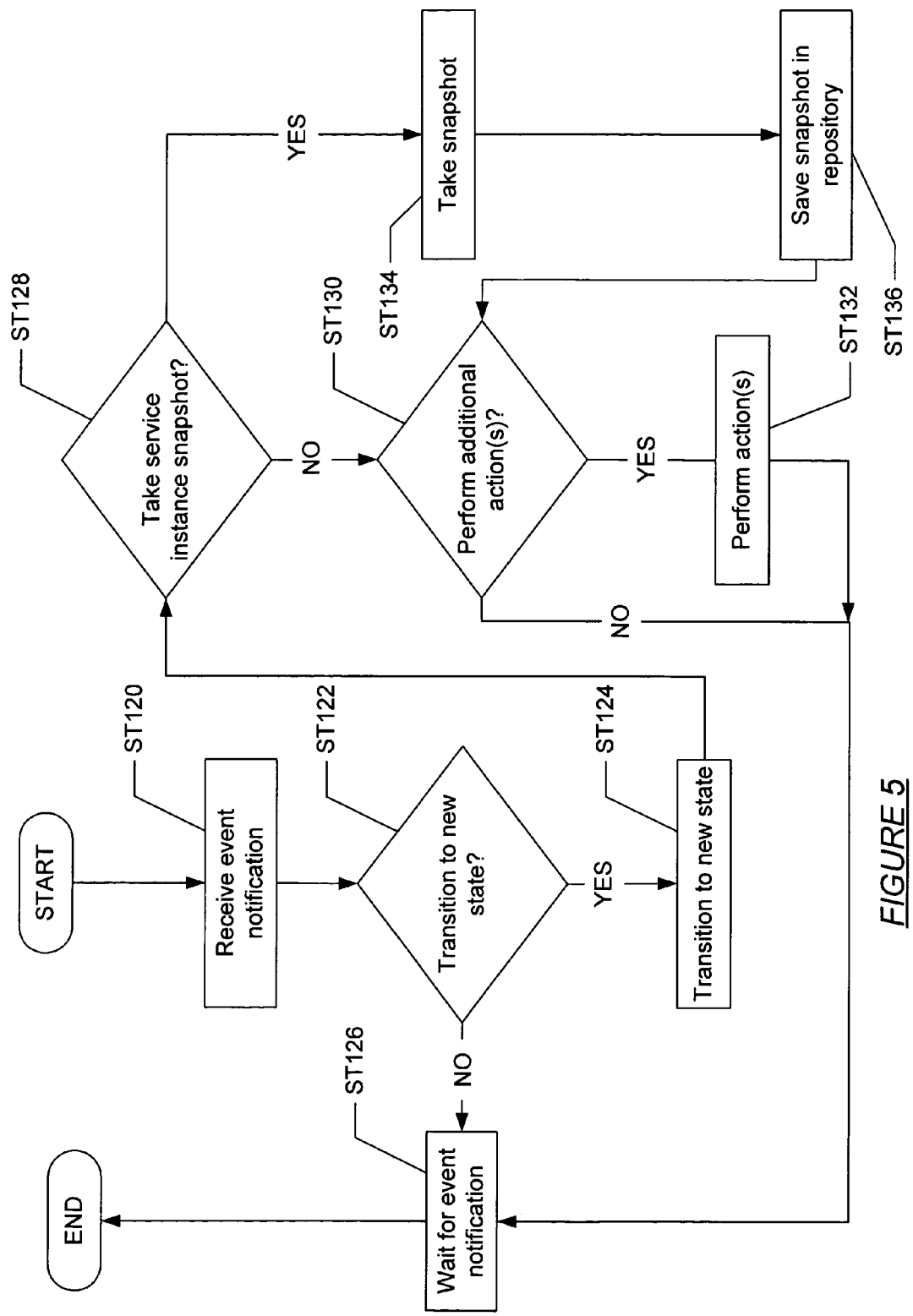

FIG. 5 shows a flowchart detailing the interaction of the various components of the system shown in FIG. 1 in accordance with one embodiment of the invention. Once the service instance is in the uninitialized state (see ST108 in FIG. 4), the restarter awaits receipt of an event notification (for example, from a restarter) (ST120). In one embodiment of the invention, the event notifications corresponds to any event that affects (or has the potential to affect) the state of the service instance. For example, the event notification may correspond to a service instance, upon which the service instance in question depends, transitioning to an online state. Once an event notification is received, a determination is made (usually by the restarter) whether the event (referenced by the event notification) enables the service instance to transition to a new state (ST122), as defined by the state machine corresponding to the service instance.

If the event does not enable the service instance to transition to a new state, then the restarter resumes waiting for additional event notifications (ST126). Alternatively, if the event enables the service instance to transition to a new state, then service instance proceeds to transition to the new state (ST124) (as defined by the state machine corresponding to the service instance). In one embodiment of the invention, the restarter performs the necessary method(s) to transition the service instance to the new state. Alternatively, the restarter uses a delegated restarter to perform some or all of the necessary methods to transition the service instance to the new state.

Once the service instance has successfully transitioned to the new state, a determination is made whether to take a service instance snapshot (ST128). In one embodiment of the invention, the determination of whether to take a service instance snapshot is governed by the state machine. If a service instance snapshot is to be taken, then the service instance snapshot is taken based on the service instance property composition information (ST134). The service instance snapshot is subsequently saved in the repository (ST136). In one embodiment of the invention, when the service instance snapshot is saved in the repository, the service instance snapshot is marked (for example using the labels defined above within the discussion of FIG. 2). Further, the current labels of the saved service instance snapshots currently located in the repository may be updated to reflect the additional service instance snapshot.

If a service instance snapshot is not to be taken, or after the service instance snapshot is saved in the repository, a determination is made as to whether additional actions need to be performed (ST130). The additional actions to perform, may be, for example, defined by the state machine. For example, if the service instance transitioned to the maintenance state, then the additional action may correspond to retrieving a service instance snapshot and then restarting the service instance using the configuration properties listed in the service instance snapshot. Once the additional actions are performed, or if there are no additional actions to perform, then the method proceeds to ST126.

Figure 6:
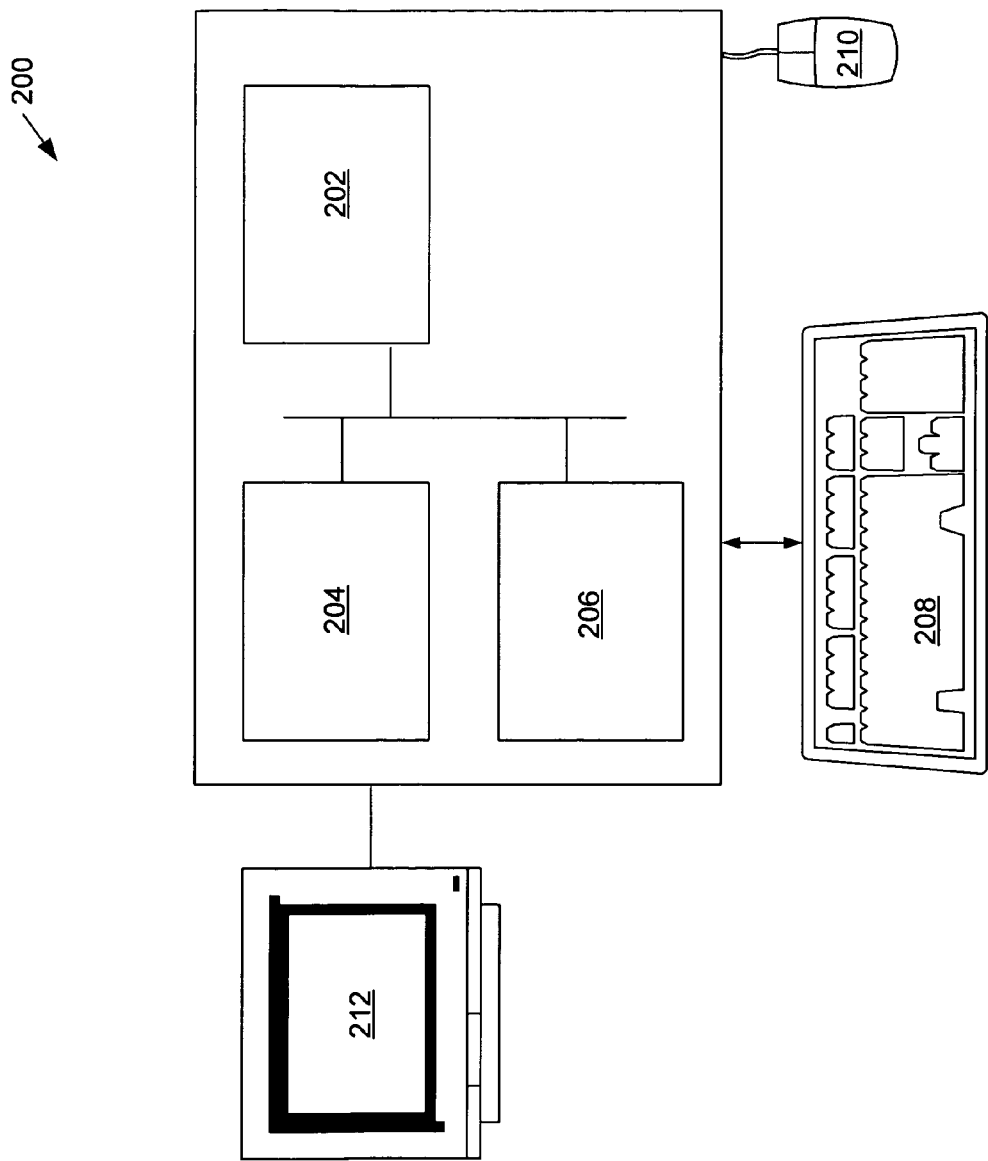
FIG. 6 shows a computer system in accordance with one embodiment of the invention.

The invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

Further, the invention may be implemented on a distributed system having a plurality of notes, where each portion of the invention (e.g., service instance, the restarter, the repository, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for taking a snapshot of a service instance, comprising:
    transitioning the service instance to a new state,
        wherein the service instance is an instance of an executable process;
    determining whether to take the snapshot based on the new state;
    obtaining a property composition of the service instance, wherein the property composition of the service instance comprises at least one configuration property of the service instance;
    taking the snapshot using the property composition; and
    restarting the service instance using the snapshot.

2. The method of claim 1, further comprising:
    receiving a notification from a monitor corresponding to the service instance, wherein the monitor is associated with the service instance; and
    determining whether to transition to the new state based upon the notification and at least one service instance execution dependency.

3. The method of claim 1, further comprising:
    storing the snapshot in a repository.

4. The method of claim 3, further comprising:
    marking the snapshot in the repository.

5. The method of claim 4, wherein the snapshot is marked using at least one label selected from the group consisting of initial, editing, running, start, boot, and previous.

6. The method of claim 1, wherein the new state is defined by a state machine associated with the service instance.

7. The method of claim 1, wherein the property composition of the service instance further comprises at least one configuration property of a service upon which the service instance depends.

8. The method of claim 7, wherein the property composition of the service instance further comprises at least one configuration property of a meta-service upon which the service depends.

9. The method of claim 1, wherein the new state is one selected from the group consisting of uninitialized, offline, online, disabled, maintenance, degraded, and legacy-run.

10. A computer system comprising:
    a service instance executing on the computer system, wherein the service instance is an instance of an executable process;
    a state machine configured to define at least a first state and a second state of the service instance; and
    a restarter configured to:
    transition the service instance from the first state to the second state,
    determine whether to take a snapshot based on the second state,
    obtain a property composition of the service instance, wherein the property composition of the service instance comprises at least one configuration property of the service instance, and
    take the snapshot of the service instance using the property composition.

11. The computer system of claim 10, further comprising:
    a repository configured to store the snapshot.

12. The computer system of claim 11, wherein the repository is further configured to mark the snapshot.

13. The computer system of claim 12, wherein the snapshot is marked using at least one selected from a group consisting of initial, editing, running, start, boot, and previous.

14. The computer system of claim 10, further comprising:
    a delegated restarter operatively connected to the restarter and configured to transition the service instance from the first state to the second state on behalf of the restarter, wherein the delegated restarter is configured to restart the service instance.

15. The computer system of claim 10, wherein the first state is one selected from the group consisting of uninitialized, offline, online, disabled, maintenance, degraded, and legacy-run.

16. The computer system of claim 10, wherein the second state is one selected from the group consisting of uninitialized, offline, online, disabled, maintenance, degraded, and legacy-run.

17. The computer system of claim 10, wherein the property composition of the service instance further comprises at least one configuration property of a service upon which the service instance depends.

18. The computer system of claim 17, wherein the property composition of the service instance further comprises at least one configuration property of a meta-service upon which the service depends.

19. The computer system of claim 10, wherein the restarter is further configured to restart the service instance using the snapshot.

20. The computer system of claim 10, wherein the restarter is further configured to:
    receive a notification from a monitor corresponding to the service instance, wherein the monitor is associated with the service instance; and determine whether to transition to the second state based upon the notification and at least one service instance execution dependency.

21. A distributed system of a plurality of nodes comprising:

a service instance executing on a computer system, wherein the service instance is an instance of an executable process;

a state machine configured to define at least a first state and a second state of the service instance; and a restarter configured to:

transition the service instance from the first state to the second state, determine whether to take a snapshot based on the second state, obtain a property composition of the service instance, wherein the property composition of the service instance comprises at least one configuration property of the service instance, and take the snapshot of the service instance using the property composition, wherein the computer system is one of the plurality of nodes, wherein the state machine resides on one of the plurality of nodes, and wherein the restarter resides on one of the plurality of nodes.

22. The distributed system of claim 21, further comprising:

a repository configured to store the snapshot, wherein the repository resides on at least one of the plurality of nodes.

* * * * *